Nov. 1, 1960  R. D. MILLER  2,958,755
ELECTRONIC SEQUENCER CONTROL CIRCUITS
Filed May 1, 1958  2 Sheets-Sheet 1

INVENTOR:
Richard D. Miller,
BY Bair, Freeman & Molinare
ATTORNEYS.

Nov. 1, 1960

R. D. MILLER 2,958,755

ELECTRONIC SEQUENCER CONTROL CIRCUITS

Filed May 1, 1958

INVENTOR:
Richard D. Miller,
BY Bair, Freeman & Molinare
ATTORNEYS.

United States Patent Office 2,958,755
Patented Nov. 1, 1960

2,958,755

ELECTRONIC SEQUENCER CONTROL CIRCUITS

Richard D. Miller, Marshalltown, Iowa, assignor to Lennox Industries, Inc., a corporation of Iowa Filed May 1, 1958, Ser. No. 732,326

6 Claims. (Cl. 219—20)

The invention relates generally to automatic control circuits for electrically operated equipment, and more particularly to a new and improved timing system for controlling electric heaters and the like.

As an illustrative, but not limiting example of the invention, it often is desirable to supplement a primary heat source with additive strip heating in the form of groups of resistance heating wires. In a heating system utilizing a heat pump as a primary source of heat, for example, the heat demand by the thermostat normally is satisfied by the heat pump itself, which contains the compressor unit.

At those times when the heat pump is unable to handle the complete heating load, it is advantageous to provide supplemental heat by energizing one or more resistance heating wires in what has been termed a strip heating circuit. Due to utility company restrictions and requirements, such resistance heating wires generally are connected in groupings that do not exceed four kilowatts each and which are brought into the circuit one grouping at a time.

Accordingly, it is desirable to provide a system in which the thermostat contacts close to bring in the heat pump when heat is desired, and when the heat pump is unable to supply the total demand load, the strip heater units are brought in one at a time with suitable time delay intervals between the energization of successive units. Program controllers known in the art, such as clock motors or damper motor systems, have not proved satisfactory for this purpose since they have the objectionable feature that once the thermostat is satisfied, they have to unwind, which takes approximately the same time that was required to operate the unit initially. Such prior art devices have the further disadvantage of being burdened with vulnerable mechanical moving parts which often results in breakdown and undesirable shut-down periods.

Therefore, it is a general object of this invention to provide a new and improved timing system for controlling electrically operated work circuits. More particularly, it is an object of this invention to provide such a timing system which eliminates the above-described disadvantages.

It is another object of this invention to provide new and improved timing circuitry which utilizes thermal time delays for providing a sequencing function to control electrically operated work circuits, such as electric heaters and the like.

It is still another object of this invention to provide new and improved timing circuitry which comprises a plurality of thermostatic delay devices each including a bimetal and an associated heating element, and circuit means connecting the bimetal contacts of each thermostatic delay device in series with the winding of a control relay and with the heating element of the succeeding thermal time delay stage to the end that the several control relays are energized in a sequential manner and with a desired delay interval between each energization.

It is a further object of this invention to provide new and improved timing circuitry which comprises a plurality of thermistors or resistance elements having a negative temperature coefficient, and circuit means connecting each thermistor in series with the winding of a control relay and with the thermistor of a succeeding thermistor stage to the end that the several control relays are energized in a sequential manner and with a desired delay interval between successive energizations.

It is a still further object of this invention to provide new and improved timing circuitry, as described above, which is characterized by its relatively few mechanical moving parts, its flexibility and its economy of operation and maintenance.

It is a still further object of this invention to provide new and improved timing circuitry as described above, which is equally adaptable for use with either two-phase or three-phase power systems.

Further objects and advantages of the invention will become apparent as the following description proceeds, and the features of the invention will be pointed out with particularity in the claims annexed to and forming a part of this specification.

Some illustrative embodiments of this invention are shown in the accompanying drawing in which.

Figure 1:
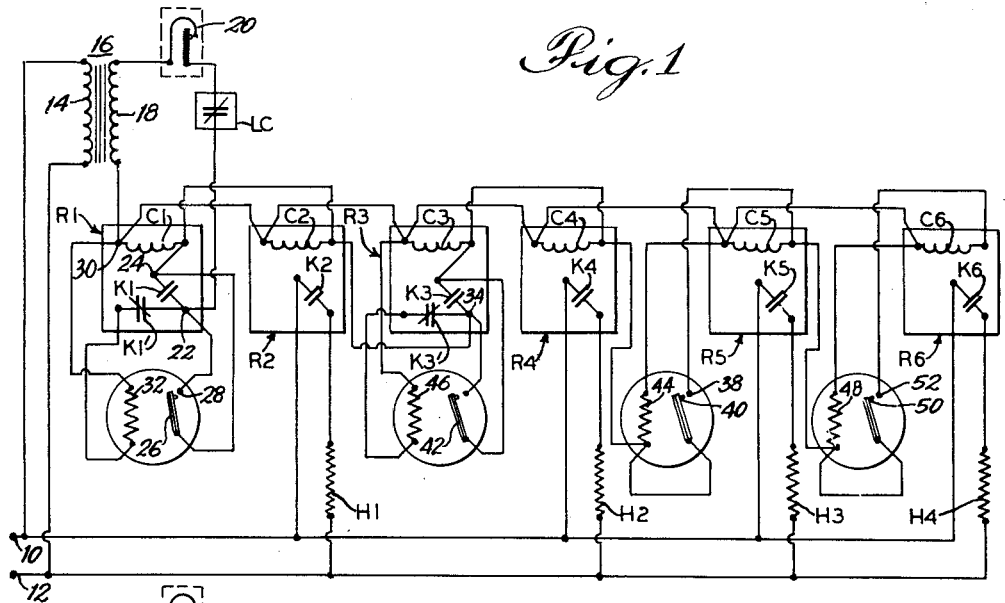
Figure 1 is a schematic diagram representation of an illustrative thermostatic time delay sequencer embodying the invention.

Referring now to the drawing, and more particularly to Figure 1, there is shown one specific illustrative embodiment of the invention in which the thermal time delays advantageously take the form of thermostat or bimetal operated switches. Power leads 10 and 12 supply power to the circuit from any source of power, such as a 230 v. A.C. source (not shown). Power leads 10 and 12 are connected to the primary winding 14 of a step-down transformer 16, and also to a plurality of electrically operated work circuits, as for example, a plurality of strip heating circuits such as the four resistance heaters H1, H2, H3 and H4 shown in the particular embodiment of Figure 1.

Thus, power leads 10 and 12 are connected to a circuit comprising a resistance heater H1 in series with the normally open contacts K2 of the relay coil C2; to a circuit comprising the resistance heater H2 in series with the normally open contacts K4 of relay coil C4, to a circuit comprising the resistance heater H3 in series with the normally open contacts K5 of the relay coil C5; and to a circuit comprising the resistance heater H4 in series with the normally open contacts K6 of the relay coil C6.

One terminal of the secondary winding 18 of the step-down transformer 16 is connected to the main control thermostat 20, which in turn is connected by the normally closed limit control switch contacts LC to terminal 22 of the relay C1. The normally open contacts K1 of relay R1 are connected between the relay terminals 22 and 24, and a thermostat switch comprising a bi-metal armature 26 and stationary contact 28 also are connected between terminals 22 and 24 in parallel with contacts K1.

The other terminal of secondary winding 18 of transformer 16 is connected to terminal 30 of relay R1 to which, in turn, is connected the bi-metal resistance heater 32 positioned in operative heating relationship with the bi-metal armature 26. A pair of normally closed contacts K1' of relay R1 is connected between terminal 22 and the bi-metal resistance heater 32. The coil C1 of relay R1 is connected between terminal 30 and terminal 24, and it can be seen that the coil C2 of relay R2 is connected in parallel with the coil C1 of relay R1.

Relays R3 and R4 are connected in a manner similar to relays R1 and R2 with the exception that terminal 34 of relay R3 (which corresponds to terminal 22 of relay R1) is electrically connected to terminal 24 of relay R1 rather than to the limit control switch contacts LC. Consequently, power cannot be applied to relays R3 and R4 until contacts K1 close in response to the energization of relay R1.

It further can be seen from Figure 1 that the coil C5 of relay R5 has one terminal connected directly to the secondary winding 18 of transformer 16, and that the other terminal of coil C5 is connected to its bi-metal switch contact 38, the armature 40 of which is connected to the armature 42 of the bi-metal associated with relay R3. The bi-metal resistance heater 44 associated with relay R5 is connected between the transformer secondary winding 18 and relay coil C5.

The thermal delay bi-metal switch associated with the relay R6 is connected in a manner similar to the thermal delay bi-metal switch described above with respect to relay R5. In analyzing the operation of the embodiment of Figure 1, it will be appreciated by those skilled in the art that the thermal time delay comprising the bi-metal armature associated with each relay is actuated by a fixed value of watt-seconds and an associated resistance heating element. Since the switch of the thermal time delay is connected in series with the coil of the relay controlling the work circuit or electric heating elements, the closure of the time delay switch after a predetermined period of time energizes the relay coil to permit current flow through the heating resistance.

Thus, when a heat demand is present, as indicated by the closing of the contacts of the main control thermostat 20, current flows through the bi-metal heater 32 associated with relays R1. After the predetermined time delay, during which the thermostat heater 32 causes the bi-metal contacts to close, the coil C1 of relay R1 is energized to close its normally open contacts K1 and to open its normally closed contacts K1'. The closure of contacts K1 short circuit the bi-metal switch to maintain coil C1 energized. At the same time, the opening of contacts K1' terminates the current flow through the bi-metal heating resistance 32 to permit resistance 32 to cool. The coil C2 of relay R2 is connected in parallel with the coil C1 of relay R1 and thus, coil C2 is energized at the same time as coil C1. The energization of coil C2 closes the normally open contacts K2 and the strip heating resistance H1 is energized by the power leads 10 and 12 to bring in the first stage of supplemental heat.

As soon as the first set of relays, R1 and R2 have been actuated, power is supplied through normally closed contacts K3' to the bi-metal heating resistance 46 associated with the relay R3. The operational steps outlined above are repeated in that bi-metal heating resistance 46, after a predetermined period of time, operates the bi-metal 42 to energize the relay coils C3 and C4 respectively, and to cause the bi-metal heating resistance 44 to be de-energized. The energization of relay coil C4 closes the normally open contacts K4 and thereby permits the strip heating resistance H2 to become energized to add a further strip heating element to the heating circuit.

It will be readily appreciated by those skilled in the art that energization of relay coils C3 and C4 permits current to flow through the bi-metal heater 44 associated with relay R5. Thus, after a predetermined period of time, the bi-metal contacts 38 and 40 close to energize relay coil C5. Consequently, contacts K5 are closed to add strip heating resistance H3 to the heating circuit.

Similarly, the energization of relay coil C5 permits current to flow through the bi-metal resistance heater 48 associated with relay R6, and after a predetermined period of time, the bi-metal contacts 50 and 52 close to energize relay coil C6. This results in closing the contacts K6 for energizing the strip heating resistance H4 from the power leads 10 and 12.

It now is understood that the circuit shown in Figure 1 forms an effective programmer or sequencer for energizing a plurality of electrical work circuits in a predetermined sequence without the use of clock motors or similar power operated devices. In particular, the work circuits may take the form of strip heating resistance elements which are energized one at a time in response to a heat demand to the end that the complete heating load is not placed upon the power source at one time. In accordance with one specific embodiment of this invention, the sequencing circuit shown in Figure 1 serves to bring in resistance heating wires in groups that do not exceed 4 kilowatts each at time intervals of one minute to three minutes apart thereby preventing an intolerable demand for being placed upon a capacity of the power source.

It will be appreciated by those skilled in the art that as long as the contacts of the main control thermostat 20 or the limit switch LC remain closed, the heating elements H1, H2, H3, and H4 will remain continuously energized. If either of these switches open their contacts, all of the electrical heating elements in the circuit are instantaneously and simultaneously de-energized, and the electrical sequencer is ready to start the timing program from its initial condition.

Figure 2:
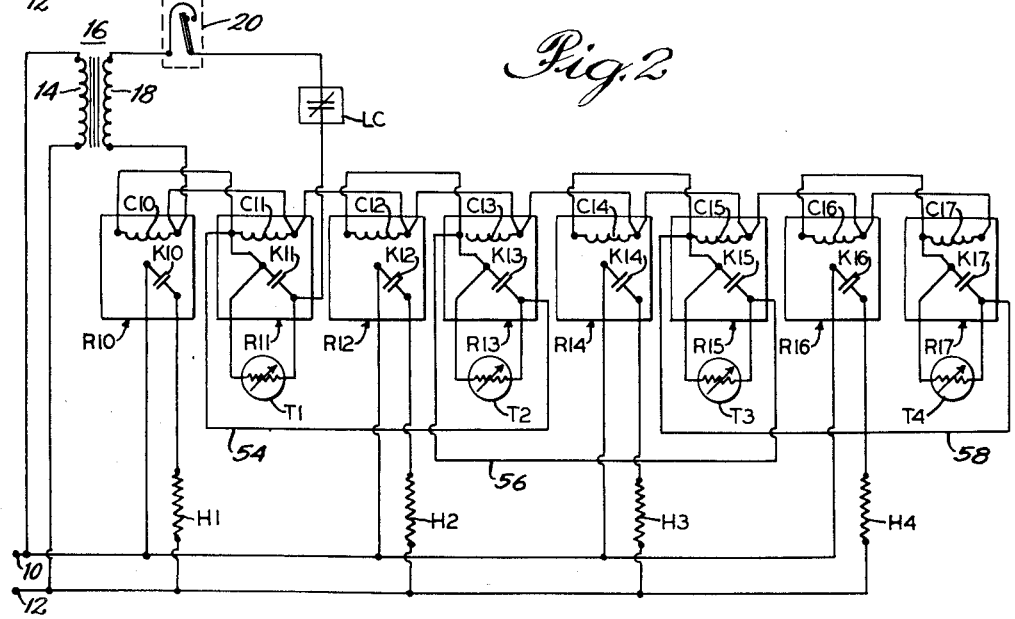
Figure 2 is a schematic diagram representation of an illustrative thermistor time delay sequencer embodying the invention.

An alternative embodiment of the invention which advantageously may be used in lieu of the circuit shown in Figure 1 as shown in Figure 2 of the drawing. The circuit of Figure 2 is similar in many respects to the circuit of Figure 1, and therefore like reference numerals have been used to designate like elements.

The major difference between the circuits of Figures 1 and 2 resides in the particular thermal delay elements used. Thus, in lieu of the thermostat or bi-metal type thermal time delays used in the circuit of Figure 1, thermistors or resistances having negative temperature coefficients have been used in the circuit of Figure 2.

The control elements for the first stage heating resistance H1 comprise a pair of relays R10 and R11, respectively. The relay coils C10 and C11 are connected in parallel with each other and to one terminal of the secondary winding 18 of the transformer 16. The other terminal of secondary winding 18 is connected through the contacts of the main control thermostat 20 and the limit control switch LC to the parallel circuit comprising thermistor T1 and the normally open contacts K11 and R11. The latter, in turn, are connected to the relay coils C10 and C11. The first stage heater comprises a resistance heating element H1 connected in series with the normally open contacts K10 of relay R10 across the power leads 10 and 12.

The second stage heater comprises a resistance heating element H2 and its associated relays R12 and R13 are connected in a manner similar to relays R10 and R11 with the exception that the thermistor T2 and the normally open contacts K13 of relay R13 are connected in series by conductor 56 to the coils C10 and C11 of relays R10 and R11, respectively.

Similarly, the third stage resistance heating element H3 and its associated relays R14 and R15, and the fourth stage resistance heating element H4 and its associated relays R16 and R17 are connected as described hereinabove with the exception that the thermistor T3 and the normally open contacts K15 of relay R15 are connected in series by conductor 56 to the coils C12 and C13 of relays R12 and R13, respectively, while the thermistor T4 and the normally open contacts K17 of relay R17 are connected in series by conductor 58 to the coils C14 and C15 of relays R14 and R15, respectively.

In the operation of the circuit shown in Figure 2, wherein the resistance heating elements H1 through H4 are energized in a sequential manner, the inherent thermal inertia of the thermistor in each stage delays the rise of current to the value necessary for its associated relay coils to become energized and close their contacts. Thus, when the main control thermostat 20 closes its contacts, current is caused to flow from the transformer secondary winding 18 through the thermistor T1 and the relay coils C10 and C11.

Due to the initial large resistance of thermistor T1, the voltage across thermistor T1 is relatively large, and therefore, the voltage across the relay coils C10 and C11 is insufficient to energize the relays and actuate the relay contacts. In accordance with the known negative temperature coefficient characteristics of thermistors, the heating of thermistor T1 by the current flowing therethrough causes its resistance to decrease, and consequently, the voltage across thermistor T1 decreases with time with a consequent increase of voltage across relay coils C10 and C11 with time. After a predetermined period of time—dependent upon the particular characteristics of the thermistor used—the voltage across relay coils C10 and C11 has increased sufficiently to actuate the relays R10 and R11, and thereby close the normally open relay contacts K10 and K11.

Figure 3:
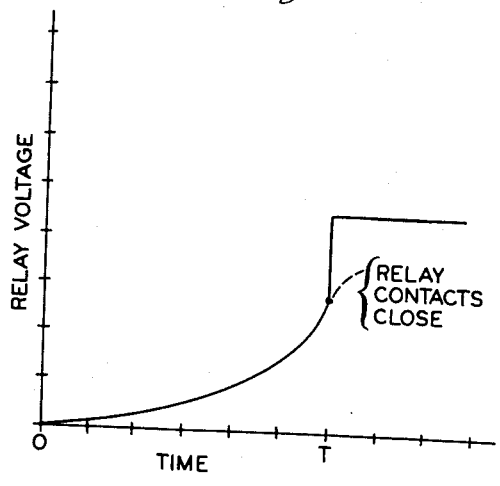
Figure 3 is a voltage-time curve illustrating the operation of the thermistor time delays as embodied in the circuit of Figure 2.
Figure 4:
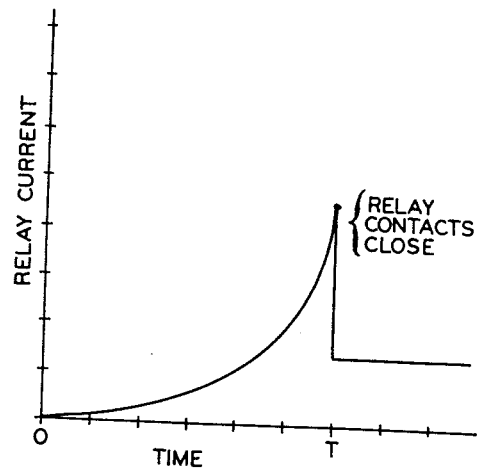
Figure 4 is a current-time curve illustrating the operation of the thermistor time delay as embodied in the circuit of Figure 2.

It will be appreciated by those skilled in the art that the closing of relay contacts K10 causes full line voltage to be applied to the resistance heating elements H1 by the power leads 10 and 12. The closing of relay contacts K11 short-circuits the thermistor T1, allowing it to cool, and at the same time, a holding circuit for the relay coils C10 and C11 is completed through contacts K11 to permit full line voltage to be applied thereto. This action is illustrated by the relay voltage-time curve shown in Figure 3 of the drawing and the relay current-time curve shown in Figure 4 of the drawing. The relay voltage-time curve indicates that at the time $T=0$, the relay voltage is substantially zero. From the time $T=0$ to the time $T=T$, the relay voltage increases in value at a determinable rate, and when the voltage across relay coil C11 is sufficient to close contacts K11—at the time $T=T$—the relay voltage increases to the full line voltage as indicated by the very rapid rise shown in the vertical portion of the voltage-time curve. As indicated by Figure 4 of the drawing, the relay current is substantially zero at the time $T=0$. From the time $T=0$ to the time $T=T$, the relay current increases in accordance with the increase in relay voltage and reaches a peak at the time $T=T$ when the relay voltage is sufficient to close the contacts K11. After the closing of contacts K11 and the short-circuiting of thermistor T1, the relay current drops rapidly to a steady, lower value since less current is required to hold contacts K11 in the closed position than is required initially to cause the contacts K11 to close.

As soon as the first set of relays, i.e., relays R10 and R11, have closed their contacts, full line voltage is applied to the second set of relays R12 and R13, respectively. The operation described above is repeated in that the voltage across relay coils C12 and C13 rises slowly as determined by the characteristics of thermistor T2, and when the relay R13 is actuated to short-circuit the thermistor T2, the voltage across relay coils C12 and C13 rises to its full value. At this time, relay coil C12 closes its contacts K12 to cause full line voltage to be applied to the second stage resistance heating element H2. The third and fourth pairs of relays are energized in a similar sequential manner to permit full line voltage to be applied to the resistance heating elements H3 and H4, respectively, in the desired sequence.

Figure 5:
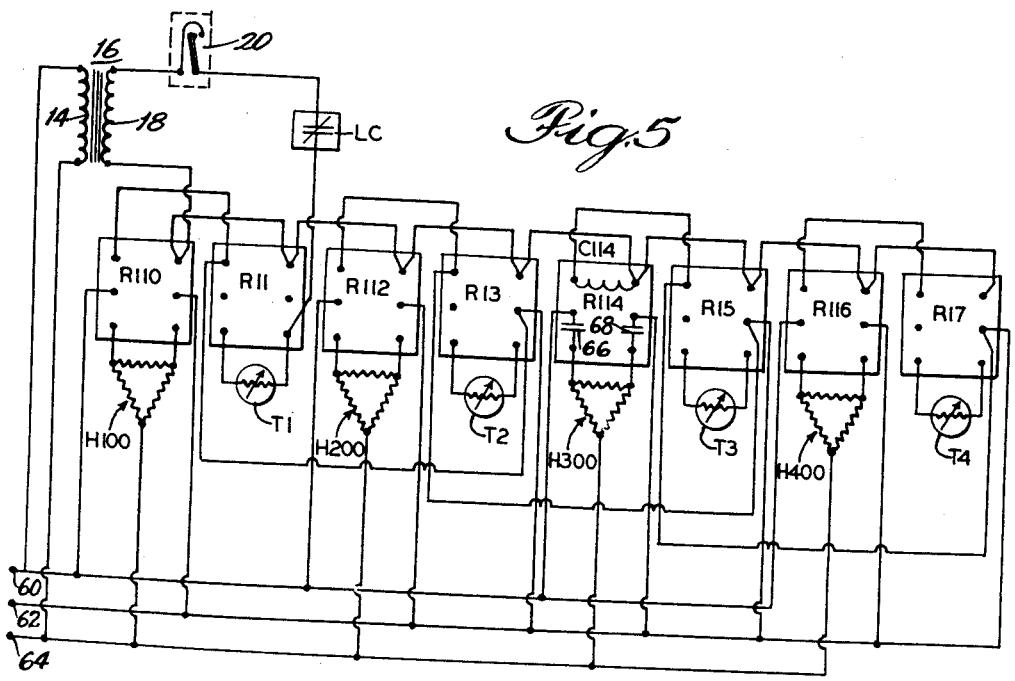
Figure 5 is a schematic diagram, partially in block form, of an illustrative thermistor time delay sequencer embodying the invention as utilized in a three-phase power system.

Those skilled in the art will readily appreciate that the principles of the invention illustrated in the two-phase circuits of Figures 1 and 2 also may be utilized with equally advantageous results in a three-phase power system, such as that illustrated in Figure 5 of the drawing. An explanation of the operation of the three-phase circuit shown in Figure 5 is facilitated by making this circuit similar to the thermistor control circuit of Figure 2, and like reference numerals have been used to identify similar circuit elements. Thus, the three-phase circuit of Figure 5 comprises a first stage heater H100 controlled by a pair of relays R110 and R11, a second stage heater H200 controlled by a pair of relays R112 and R13, a third heater H300 controlled by a pair of relays R114 and R15 and a fourth stage heater H400 controlled by a pair of relays R116 and R17. The relays R11, R13, R15 and R17 are operatively connected in circuit with thermistors T1, T2, T3 and T4, respectively, and these elements advantageously may be identical to the correspondingly numbered elements shown in Figure 2.

The circuit of Figure 5 differs from the circuit of Figure 2 primarily in that the three-phase voltage is applied to the control circuit by the power leads 60, 62, and 64, and further, in that the heaters advantageously take the form of delta connected resistance heating elements controlled by a pair of contacts in their associated relay circuits. The details of such circuits are illustrated in the schematic drawing of relay 114 and heater 300 of the Figure 5 circuit. It can there be seen that one terminal of the delta connected heater H300 is connected directly to power lead 64; a second terminal of heater H300 is connected through the normally open contacts 66 of relay R114 to the power lead 60; and the third terminal of heater 300 is connected through normally open contacts 68 of relay 114 to the power lead 62. Thus, when the relay coil C114 is de-energized, the contacts 66 and 68 are open and the heater H300 also is de-energized. When during the sequential operation of the Figure 5 circuit, the relay coil C114 is energized due to the operation of thermistor T3, the contacts 66 and 68 are closed to cause the full three-phase line voltage to be applied to heater H300 for energizing the heater. In all other respects, the circuit of Figure 5 operates in the manner described above with respect to the circuit of Figure 2.

It will be understood by those skilled in the art that as long as the contacts of the main control thermostat 20 and the limit control switch LC remain closed, the electric heating elements H1 through H4 of Figures 1 and 2, and electric heating elements H100 through H400 of Figure 5, will be continuously energized. When either of these contacts are opened, all of the electric heating elements are instantaneously and simultaneously de-energized, and the sequencing circuit is ready to start the timing program from its initial state or condition.

It further will be understood by those skilled in the art that modifications may be made in the construction, and circuit arrangement of the parts of the above-described novel sequencer or programmer without departing from the real spirit and purpose of the invention, and it is intended to cover by the appended claims any modified structure or use of equivalents which reasonably may be included within their scope.

What is claimed as the invention is:

1. A sequencer for providing a time delay control function comprising a pluarlity of relays, each having a winding and at least one pair of contacts, a work circuit connected in series with a pair of contacts of each of said relays, a source of potential connected to each of said work circuits and said pair of contacts whereby closure of said pair of contacts in response to the energization of its associated winding causes the work circuit to be energized by said source of potential, and circuit means for energizing the windings of each of said relays in a desired sequence comprising a plurality of thermal time delay devices, one for each work circuit, means for connecting each of said thermal time delay devices in circuit with the winding of its associated relay, means for connecting each thermal time delay device but one in circuit with the succeeding thermal time delay device, and switch means associated with said source of potential operable to energize a first one of said time delay devices, for enabling the energization of its associated work circuit and for enabling a potential to be applied to the succeeding thermal time delay device after a desired time delay, whereby the thermal time delays and their associated work circuits are energized in sequence with a desired time delay between each energization.

2. A sequencer for providing a time delay control function comprising a plurality of relays, each having a winding and at least one pair of contacts, a work circuit connected in series with a pair of contacts of each of said relays, a source of potential connected to each of said work circuits and said pair of contacts whereby closure of said pair of contacts in response to the energization of its winding causes the work circuit to be energized by said source of potential, and circuit means for energizing the windings of each of said relays in accordance with a desired sequence comprising a plurality of thermal time delay devices, one for each work circuit connected in circuit with the winding of its associated relay, and switch means associated with said source of potential operable to energize a first one of said time delay devices for enabling the energization of its associated work circuit and for enabling a potential to be applied to the succeeding thermal time delay device after a desired time delay, whereby the thermal time delays and their associated work circuits are energized in sequence with a desired time delay between each energization and are de-energized simultaneously upon opening of said switch means.

3. A sequencer for providing a time delay control function comprising a plurality of relays, a work circuit operatively associated with each of said relays, whereby energization of each relay causes its associated work circuit to be energized, and circuit means for energizing each of said relays in accordance with a desired sequence comprising a thermal time delay device for each work circuit connected in circuit with its associated relay, and switch means operable to energize a first one of said thermal time delay devices for enabling the energization of its associated work circuit and for enabling a potential to be applied to the succeeding thermal time delay device after a desired time delay, whereby the thermal time delays and their associated work circuits are energized in sequence with a desired time delay between each energization and are de-energized simultaneously upon opening of said switch means.

4. A sequencer for providing a time delay control function in accordance with claim 3 wherein said thermal time delay device comprises a bimetal switch and a heating element operatively associated with said bimetal switch for opening and closing the latter in accordance with the temperature of said heating element.

5. A sequencer for providing a time delay control function in accordance with claim 3 wherein said work circuit comprises resistance heating means adapted to supply a heating function when it is energized in response to the energization of its associated relay.

6. Apparatus for energizing the plurality of work circuits in a desired sequence comprising a plurality of thermostat controlled delay stages, each of said delay stages including a bimetal switch, a work circuit operatively connected to each of said relay stages, a source of potential connected to each bimetal switch and to the work circuit associated therewith whereby closure of a bimetal switch in a thermostat controled delay stage completes a circuit to enable its associated work circuit to be energized by said source of potential, and circuit means connecting said thermostat controlled delay stages in a sequential manner to enable the bimetal switches and their associated work circuits to be energized by said source of potential in a sequential manner with a desired time delay between each energization and to remain energized until all of the bimetal switches and their associated work circuits are de-energized simultaneously upon disconnection from said source of potential.

References Cited in the file of this patent

UNITED STATES PATENTS

| | | |
|---|---|---|
| 1,516,646 | Roseby | Nov. 25, 1924 |
| 1,638,857 | Keene | Aug. 16, 1927 |
| 1,937,042 | Kercher | Nov. 28, 1933 |
| 2,302,535 | Durbin | Nov. 17, 1942 |
| 2,684,456 | Sidebottom | July 20, 1954 |